Patented May 14, 1940

2,200,429

UNITED STATES PATENT OFFICE 2,200,429

INTERPOLYMERIZATION OF ETHYLENE

Michael Willcox Perrin, Eric William Fawcett, John Greves Paton, and Edmond George Williams, Northwich, England, assignors to Imperial Chemical Industries Limited, a corporation of Great Britain No Drawing. Application April 21, 1938, Serial No. 203,442. In Great Britain April 22, 1937

19 Claims. (Cl. 260—80)

This invention relates to the interpolymerization of organic compounds.

This invention has as an object to provide new organic compounds. A further object is to devise methods of manufacturing new organic compounds. A still further object is to provide new organic compounds of high molecular weight. A still further object is to devise methods of manufacturing new organic compounds of high molecular weight. Further objects will appear hereinafter. These objects are accomplished by the following invention.

We have found that if we subject ethylene together with other polymerizable organic compounds containing one or more double bonds to conditions of pressure and temperature similar to those required for the conversion of ethylene into solid or semi-solid polymers, we obtain valuable high-molecular interpolymerization products, i. e. compounds of high molecular weight relative to any of the starting materials, by the polymerization of one or more of the starting materials and the occurrence of chemical reaction or reactions between the different kinds of molecules present at some stage of the polymerization. The reaction conditions for the conversion of ethylene, which may contain a small amount of oxygen, are disclosed in pending U. S. application Serial Nos. 123,722 filed Feb. 2, 1937 and 157,810 filed Aug. 6, 1937 and comprise the use of pressures of at least 500 atmospheres, e. g. 1500 atmospheres or more, and temperatures between 100° and 400° C. Such pressure and temperature conditions apply also to the present invention and a small quantity of oxygen, for example between 0.01 and 5 per cent, may advantageously be present.

The invention is illustrated but not limited by the following examples.

Example 1

A sealed glass tube containing 10 cc. of liquid butadiene is placed in a thick-walled steel pressure vessel of 80 c. c. capacity. The vessel is filled with ethylene containing 0.1% by weight of oxygen, to a pressure of 1,500 atmospheres, so that the glass tube is broken. The contents of the vessel are stirred mechanically and it is heated at 230° C. for 3 hours, the pressure being adjusted to 1500 atmospheres in the hot. The product consists of 16 grams of a very viscous liquid, which dries on exposure to air to give a soft rubbery solid. By treatment of the liquid product at 100° C. in a good vacuum some butadiene dimer is removed by distillation, and by extraction with hot benzene some solid polymer of ethylene is removed. The residue, about 20% by weight of the original product, is sparingly soluble in hot benzene and is an interpolymer of ethylene and butadiene, as shown by the presence in it of a number of double bonds.

Example 2

This example shows the formation of interpolymers of ethylene and styrene in various proportions.

In three experiments, quantities of 25 c. c., 10 c. c., and 5 c. c. respectively of styrene monomer are added to a thick-walled steel reaction vessel of 80 c. c. capacity. Ethylene containing 0.04% by weight of oxygen is compressed into the vessel to a pressure of 1500 atmospheres. The contents of the vessel are stirred mechanically and it is heated at 200° C. for 20 hours in each case the pressure being adjusted to 1500 atmospheres in the hot. An interpolymer of styrene and ethylene is formed in each case. By analysis of the carbon-hydrogen ratio, in the first experiment the interpolymer is found to contain 75% by weight of styrene; in the second 53%, and in the third 40%. The product of the first experiment is a hard tough solid; that of the second experiment is a hard pliable solid; and that of the third experiment is a tough rubbery solid.

The molecular weight of the interpolymer is, in each case, about 10000. That the products are true interpolymers may be seen from the fact that they are homogeneous, while polymerized ethylene and polymerized styrene are not compatible with each other.

Example 3

A mixture of 83 per cent by weight of ethylene containing 0.06% of oxygen and 17 per cent by weight of stilbene is subjected to a temperature of 210° C. at a reaction pressure of 2500 atmospheres for several hours. The reaction product is a dark solid of molecular weight about 3000. It softens at 85° C.

Under the same conditions a reaction mixture consisting of equal parts by weight of ethylene and stilbene gives a product which has a molecular weight of over 3000 and a softening point of 91° C. This product can be worked up into the form of films by the usual methods.

Example 4

A mixture of 80 per cent by weight of ethylene containing 0.06% of oxygen and 20 per cent by weight of limonene is subjected to a temperature of 250° C. and a reaction pressure of 2500 atmospheres for 18 hours. The reaction product is a soft wax of melting point about 60° C.

Example 5

A quantity of 10 c. c. of maleic acid diethyl ester is placed in a thick-walled steel reaction vessel of 80 c. c. capacity. Ethylene containing 0.06 per cent of oxygen is compressed into the vessel to a pressure giving a reaction pressure of 1500 atmospheres. The contents of the vessel are stirred mechanically and it is heated at 210° C. for 17 hours.

The reaction product contains about 30 per cent of ester in the form of an interpolymer with the polymerized ethylene. The softening point of the product is 94° C.

*Example 6*

The procedure of Example 5 is repeated using 10 c. c. of the diethyl ester of fumaric acid instead of the diethyl ester of maleic acid.

The reaction product contains about 25 per cent of the ester and has a softening point of 105° C.

*Example 7*

The procedure of Example 5 is repeated using 10 c. c. of the diethyl ester of itaconic acid instead of the diethyl ester of maleic acid.

The reaction product contains about 25 per cent of the ester and has a softening point of 97° C.

*Example 8*

The procedure of Example 5 is repeated using 10 c. c. of the diethyl ester of citraconic acid instead of the diethyl ester of maleic acid and using a pressure of ethylene of 2500 atmospheres instead of 1500 atmospheres.

The reaction product contains about 25 per cent of the ester and has a softening point of 92° C.

*Example 9*

This example illustrates the interpolymerization of ethylene and methyl methcrylate. The general conditions are similar to those of Example 2 (except that the ethylene pressure used is 2500 atmospheres), i. e. the methyl methacrylate monomer is placed in the reaction vessel, then ethylene is compressed in. In six experiments with varying amounts of the methyl methacrylate monomer, products containing from about 9% to about 80% of methyl methacrylate were obtained. The tensile strength of the 9% product is about 1.1 kg./mm.$^2$, that of the 80% product is about 3.7; the softening points are respectively about 108° C. and 140° C. It appears that both the tensile strength and softening point first pass through a minimum with increasing methyl methacrylate content, before assuming the higher values quoted.

The products can be cold-drawn, with a substantial increase in their tensile strength. They can be readily compression-moulded.

*Example 10*

A quantity of 10 c. c. of butyl methacrylate is placed in an autoclave of 80 c. c. capacity and ethylene containing 0.05% of oxygen is forced in at a pressure of 1500 atmospheres. The autoclave is heated at 210° C. for 17 hours, during which time the contents are stirred mechanically.

The reaction product contains 25% of butyl methacrylate and is a soft non-elastic mass having a softening point of 99° C.

*Example 11*

A quantity of 1 c. c. of glycol dimethacrylate is placed in an autoclave of 80 c. c. capacity and ethylene containing 0.05% of oxygen is forced in at a pressure of 1500 atmospheres. The autoclave is heated to 210° C. for 17 hours, during which time the contents are stirred mechanically.

The reaction product contains 5% of glycol dimethacrylate and is a sparingly soluble solid having a high scratch hardness.

*Example 12*

The procedure of Example 11 is repeated using 10 c. c. of glycol dimethacrylate instead of 1 c. c.

The reaction product is an insoluble solid which is very hard. It contains about 60% of glycol dimethacrylate.

*Example 13*

A quantity of 10 c. c. of vinyl acetate is placed in an autoclave of 80 c. c. capacity and ethylene containing 0.06% of oxygen is forced in at a pressure of 2500 atmospheres. The autoclave is heated to 210° C. for 18 hours, during which time the contents are stirred mechanically.

The reaction product is a solid of softening point 92° C. which can readily be drawn into threads. It contains about 25 per cent of vinyl acetate in the form of an interpolymer with the polymerized ethylene.

*Example 14*

A mixture containing 40 per cent by weight of ethylene and 60 per cent by weight of isobutylene, together with an amount of benzoyl peroxide equivalent to 0.1 per cent by weight of the mixture of available oxygen, is subjected to a temperature of 210° C. and a pressure of 1500 atmospheres for about 17 hours. The reaction product is a mixture of a soft solid and a liquid of terpene-like character.

*Example 15*

A mixture containing 80 per cent by weight of ethylene and 20 per cent by weight of amylene is subjected to a temperature of 250° C. and a pressure of 2500 atmospheres for 3 hours. The reaction product is a hard wax resembling paraffin wax, having a molecular weight between 1500 and 2000.

The pressures given in the above examples are the pressures at which the reaction is actually carried out, that is to say, either we start with a lower initial pressure which goes up to the required pressure on heating or we start at about the reaction pressure and keep it controlled throughout the heating.

Interpolymerization appears, in general, to lead to the production of one or other of the following types of products:

(a) Mixed single chain polymers, i. e. polymers having a long chain structure in which, in the normal chain of CH$_2$ groups characteristic of ethylene polymers, other groups are interposed at various points or intervals.

(b) Cross-linked or branched chain compounds in which single chains of the ethylene polymer type or of the mixed single chain type just mentioned, are linked or branched together directly or via intermediate groupings.

In either case, the resulting products have characteristics differing from those of ethylene polymers to an extent depending upon the nature of the starting materials and the degree of interpolymerization. In cross-linkage polymerization, the general effect is to increase the melting point and decrease the solubility of the polymer. Similar or converse effects can be obtained in interpolymerization of the first, i. e. the mixed single chain type.

As starting materials, in addition to ethylene, may be mentioned monovinyl unsaturated hydrocarbons, e. g. propylene, isobutylene, amylene, styrene and stilbene; esters of unsaturated polybasic acids, e. g. the diethyl esters of maleic, fumaric, citraconic and itaconic acids or the triethyl ester of aconitic acid; the esters of acids of the acrylic and substituted acrylic series, e. g. methyl, butyl and glycol methacrylates; vinyl esters, e. g. vinyl acetate and chloride; and compounds containing more than one double bond, e. g. butadiene, divinylbenzene, limonene, divinylacetylene and other divinyl compounds, and polymerizable unsaturated acids such as acrylic and substituted acrylic acids.

Polymerization catalysts may be added if desired, e. g. small amounts of free oxygen or benzoyl peroxide. Inert gaseous diluents, e. g. nitrogen, may also be present.

As will be appreciated from the foregoing description and examples, a wide range of interpolymerization products of ethylene with various organic compounds can be prepared under the conditions of this invention. Thus, the products may range from soft to tough or very hard solids, some rubbery, some wax-like. The significant point is, that the invention provides a method for obtaining products having properties which are different from those of the solid polymers obtained from ethylene alone. The character of the product can be varied greatly by choice of interpolymerizing compound, reaction conditions (temperature, pressure and duration), proportions of reactants, etc.

Some of the products are capable of being extruded or otherwise formed into films, threads, tubes, rods, sheets, tapes, ribbons and similar shaped forms, e. g. the interpolymers of ethylene and vinyl esters, styrene and esters of dibasic unsaturated acids, acrylic and substituted acrylic acid esters. Such films, etc., can be used for waterproofing purposes, electrical insulation, protection from corrosion and chemical attack, etc. The wax-like products may be employed for all purposes for which existing waxes are employed, e. g. polishes. Certain of the products, e. g. the interpolymers of ethylene with esters of dibasic unsaturated acids and vinyl esters can readily be obtained in the form of aqueous emulsions by standard emulsification technique. Their emulsifying properties are increased if they are first subjected to partial hydrolysis, e. g. by heating an aqueous suspension or emulsion with acid or preferably alkali. The interpolymers containing higher percentages of esters of dibasic unsaturated acids, when partially hydrolyzed, have surface active properties and may be used as emulsifying agents.

As many apparently widely different embodiments of this invention may be made without departing from the spirit and scope thereof, it is to be understood that we do not limit ourselves to the specific embodiments thereof except as defined in the appended claims.

We claim:

1. A method of manufacturing organic compounds of high molecular weight which comprises heating to a temperature of between 100° C. and 400° C. at a pressure of more than 500 atmospheres a mixture containing ethylene and at least one other polymerizable organic compound having ethylenic unsaturation.

2. A method as claimed in claim 1, in which the pressure used is at least 1500 atmospheres.

3. A method as claimed in claim 1, in which there is present a substance of the class consisting of oxygen and oxidizing agents.

4. A method as claimed in claim 1, in which the other polymerizable organic compound is selected from the group consisting of polymerizable monovinyl and divinyl hydrocarbons.

5. A method as claimed in claim 1, in which the other polymerizable organic compound is selected from the group consisting of polymerizable monovinyl and divinyl esters.

6. A method as claimed in claim 1, in which the other polymerizable organic compound is selected from the group consisting of polymerizable esters of unsaturated mono- and polybasic acids.

7. A method as claimed in claim 1, in which the other polymerizable organic compound is methyl methacrylate.

8. A method as claimed in claim 1, in which the other polymerizable organic compound is styrene.

9. An interpolymer of ethylene and at least one other polymerizable organic compound having ethylenic unsaturation, said interpolymer being that obtained by heating a mixture of ethylene and said compound at a temperature of 100° C. to 400° C. under a pressure of more than 500 atmospheres.

10. The interpolymer set forth in claim 9 in which said polymerizable organic compound is selected from the group consisting of polymerizable monovinyl and divinyl hydrocarbons.

11. The interpolymer set forth in claim 9 in which said polymerizable organic compound is selected from the group consisting of polymerizable monovinyl and divinyl esters.

12. The interpolymer set forth in claim 9 in which said polymerizable organic compound is selected from the group consisting of polymerizable esters of unsaturated mono- and polybasic acids.

13. An interpolymer of ethylene and at least one other polymerizable organic compound having ethylenic unsaturation, said interpolymer being that obtained by heating a mixture of ethylene and said compound at a temperature of 100° C. to 400° C. under a pressure of at least 1500 atmospheres.

14. The interpolymer set forth in claim 9 in which said polymerizable organic compound is an ester of an alpha-methylene monocarboxylic acid.

15. The interpolymer set forth in claim 9 in which said polymerizable organic compound is an aliphatic monohydric alcohol ester of an alpha-methylene monocarboxylic acid.

16. The interpolymer set forth in claim 9 in which said polymerizable organic compound is an acyclic monohydric alcohol ester of an alpha-alkyl substituted acrylic acid.

17. The interpolymer set forth in claim 9 in which said polymerizable organic compound is methyl methacrylate.

18. The interpolymer set forth in claim 9 in which said polymerizable organic compound is styrene.

19. The interpolymer set forth in claim 9 in which said polymerizable organic compound is vinyl acetate.

MICHAEL WILLCOX PERRIN.
ERIC WILLIAM FAWCETT.
JOHN G. PATON.
EDMOND G. WILLIAMS.